US010813005B2

(12) United States Patent
Loehr et al.

(10) Patent No.: US 10,813,005 B2
(45) Date of Patent: Oct. 20, 2020

(54) SPLIT BEARER PACKET DATA CONVERGE PROTOCOL PROTOCOL DATA UNIT ROUTING

(71) Applicant: Motorola Mobility LLC, Chicago, IL (US)

(72) Inventors: Joachim Loehr, Wiesbaden (DE); Prateek Basu Mallick, Dreieich (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/226,379

(22) Filed: Dec. 19, 2018

(65) Prior Publication Data
US 2019/0124551 A1 Apr. 25, 2019

Related U.S. Application Data

(63) Continuation of application No. 15/469,325, filed on Mar. 24, 2017, now Pat. No. 10,237,784.

(51) Int. Cl.
H04W 28/06 (2009.01)
H04W 72/04 (2009.01)
H04L 29/12 (2006.01)
H04W 76/15 (2018.01)

(52) U.S. Cl.
CPC ....... H04W 28/065 (2013.01); H04L 61/6022 (2013.01); H04W 72/0486 (2013.01); H04W 76/15 (2018.02)

(58) Field of Classification Search
CPC ... H04L 5/0035; H04L 61/6022; H04L 69/22; H04W 28/065; H04W 36/0055; H04W 72/04; H04W 72/0486; H04W 76/15; H04W 76/20
See application file for complete search history.

(56) References Cited

U.S. PATENT DOCUMENTS

| 7,656,902 | B2 * | 2/2010 | Yi ........................ | H04W 28/06 370/474 |
| 8,605,674 | B2 * | 12/2013 | Park ........................ | H04L 1/08 370/329 |
| 9,264,353 | B2 | 2/2016 | Krishnaswamy et al. | |
| 9,288,734 | B2 | 3/2016 | Jha et al. | |

(Continued)

FOREIGN PATENT DOCUMENTS

| CN | 105706387 A | 6/2016 |
| EP | 3063893 | 6/2017 |

(Continued)

OTHER PUBLICATIONS

Ericsson "UL Split in Dual Connectivity", 3GPP TSG-RAN WG2 #97bis, R2-1702749, Apr. 3-7, 2017, pp. 1-4.

(Continued)

Primary Examiner — Eric Nowlin
(74) Attorney, Agent, or Firm — Kunzler Bean & Adamson

(57) ABSTRACT

For routing Packet Data Converge Protocol (PDCP) Protocol Data Units (PDU), a processor detects a split bearer configuration for a mobile device. In response to detecting the split bearer configuration, the processor routes PDCP PDU in a Radio Link Control (RLC)/Medium Access Control (MAC) for the at least two cell groups.

20 Claims, 12 Drawing Sheets

(56) References Cited

U.S. PATENT DOCUMENTS

| | | | |
|---|---|---|---|
| 9,497,299 B2 | 11/2016 | Cai | |
| 9,504,052 B2 | 11/2016 | Wu | |
| 9,549,338 B2 | 1/2017 | Kim et al. | |
| 9,560,684 B2 | 1/2017 | Sivanesan et al. | |
| 9,572,185 B2 | 2/2017 | Sivanesan et al. | |
| 9,596,707 B2 | 3/2017 | Zhu et al. | |
| 9,706,418 B2 | 7/2017 | Decarreau et al. | |
| 9,743,319 B2 | 8/2017 | Wu | |
| 9,762,482 B2 | 9/2017 | Sukumar et al. | |
| 9,788,358 B2 | 10/2017 | Pelletier et al. | |
| 9,820,176 B2 * | 11/2017 | Lee | H04W 28/0278 |
| 9,832,683 B2 | 11/2017 | Fujishiro et al. | |
| 9,838,282 B2 | 12/2017 | Dudda et al. | |
| 9,871,736 B2 | 1/2018 | Bi et al. | |
| 9,883,419 B2 | 1/2018 | Basu Mallick et al. | |
| 9,924,405 B2 | 3/2018 | Chen et al. | |
| 10,075,881 B2 * | 9/2018 | Yi | H04W 36/0072 |
| 10,172,149 B2 * | 1/2019 | Zeng | H04W 72/0413 |
| 10,368,264 B2 * | 7/2019 | Yi | H04L 41/0681 |
| 10,575,213 B2 * | 2/2020 | Jo | H04W 28/06 |
| 10,609,589 B2 * | 3/2020 | Loehr | H04W 28/0205 |
| 2010/0165992 A1 | 7/2010 | Suen et al. | |
| 2012/0057560 A1 * | 3/2012 | Park | H04L 1/189 370/329 |
| 2013/0077501 A1 | 3/2013 | Krishnaswamy et al. | |
| 2014/0362704 A1 | 12/2014 | Jha et al. | |
| 2015/0085667 A1 | 3/2015 | Sivanesan et al. | |
| 2015/0085800 A1 | 3/2015 | Sivanesan et al. | |
| 2015/0098322 A1 | 4/2015 | Chen et al. | |
| 2015/0180699 A1 | 6/2015 | Zhao et al. | |
| 2015/0215840 A1 | 7/2015 | Yiu et al. | |
| 2015/0264562 A1 | 9/2015 | Wu | |
| 2015/0326456 A1 | 11/2015 | Dudda et al. | |
| 2016/0014647 A1 * | 1/2016 | Yi | H04W 36/0072 370/331 |
| 2016/0057585 A1 | 2/2016 | Horn et al. | |
| 2016/0088127 A1 | 3/2016 | Cai | |
| 2016/0088542 A1 | 3/2016 | Belghoul et al. | |
| 2016/0119939 A1 | 4/2016 | Himayat et al. | |
| 2016/0135095 A1 | 5/2016 | Wu | |
| 2016/0156548 A1 | 6/2016 | Pazhyannur et al. | |
| 2016/0183158 A1 | 6/2016 | Decarreau et al. | |
| 2016/0212753 A1 | 7/2016 | Wu | |
| 2016/0234714 A1 | 8/2016 | Basu Mallick et al. | |
| 2016/0242193 A1 | 8/2016 | Hong et al. | |
| 2016/0255675 A1 | 9/2016 | Van Leishout et al. | |
| 2016/0277957 A1 | 9/2016 | Patel et al. | |
| 2016/0278138 A1 | 9/2016 | Chen et al. | |
| 2016/0295440 A1 * | 10/2016 | Lee | H04W 28/0278 |
| 2016/0302075 A1 * | 10/2016 | Dudda | H04W 12/10 |
| 2016/0308776 A1 | 10/2016 | Ozturk et al. | |
| 2016/0338074 A1 | 11/2016 | Chou et al. | |
| 2017/0013498 A1 * | 1/2017 | Yi | H04W 76/27 |
| 2017/0013565 A1 | 1/2017 | Pelletier et al. | |
| 2017/0027016 A1 | 1/2017 | Suga | |
| 2017/0034054 A1 | 2/2017 | Sukumar et al. | |
| 2017/0055283 A1 | 2/2017 | Shrivastava et al. | |
| 2017/0064592 A1 | 3/2017 | Cai | |
| 2017/0086254 A1 | 3/2017 | Lee et al. | |
| 2017/0135023 A1 | 5/2017 | Jung et al. | |
| 2017/0142770 A1 | 5/2017 | Fu et al. | |
| 2017/0171905 A1 | 6/2017 | Uchino et al. | |
| 2017/0215156 A1 | 7/2017 | Chen | |
| 2017/0215173 A1 | 7/2017 | Zhu et al. | |
| 2017/0303170 A1 | 10/2017 | Uchino et al. | |
| 2017/0303286 A1 | 10/2017 | Sang et al. | |
| 2018/0014255 A1 | 1/2018 | Pelletier et al. | |
| 2018/0035483 A1 | 2/2018 | Nagasaka et al. | |
| 2018/0092085 A1 * | 3/2018 | Shaheen | H04W 28/08 |
| 2018/0123920 A1 | 5/2018 | Dudda et al. | |
| 2018/0139646 A1 | 5/2018 | Basu Mallick et al. | |
| 2018/0199365 A1 | 7/2018 | Yi et al. | |
| 2018/0270718 A1 | 9/2018 | Wang et al. | |
| 2018/0279168 A1 | 9/2018 | Jheng et al. | |
| 2018/0279262 A1 | 9/2018 | Babaei et al. | |
| 2018/0309660 A1 * | 10/2018 | Loehr | H04W 36/0066 |
| 2018/0376386 A1 * | 12/2018 | Yi | H04W 36/0061 |
| 2019/0021026 A1 * | 1/2019 | Iskander | H04W 76/16 |
| 2019/0053098 A1 * | 2/2019 | Jo | H04L 69/28 |
| 2019/0069308 A1 * | 2/2019 | Lee | H04W 72/10 |
| 2019/0124551 A1 * | 4/2019 | Loehr | H04W 28/065 |
| 2019/0215719 A1 * | 7/2019 | Wei | H04L 1/00 |
| 2019/0268799 A1 * | 8/2019 | Hong | H04W 28/0278 |
| 2019/0289489 A1 * | 9/2019 | Yi | H04W 28/0205 |
| 2019/0342224 A1 * | 11/2019 | Tang | H04W 28/06 |
| 2020/0015302 A1 * | 1/2020 | Shikari | H04L 1/18 |
| 2020/0053826 A1 * | 2/2020 | Shi | H04W 76/19 |
| 2020/0068637 A1 * | 2/2020 | Yu | H04L 1/22 |
| 2020/0169909 A1 * | 5/2020 | Loehr | H04L 1/1835 |
| 2020/0187245 A1 * | 6/2020 | Fujishiro | H04W 74/002 |

FOREIGN PATENT DOCUMENTS

| | | |
|---|---|---|
| EP | 3179770 A1 | 6/2017 |
| EP | 3217716 A1 | 9/2017 |
| KR | 20160081915 A | 7/2016 |
| WO | 2015047051 A1 | 4/2015 |
| WO | 2015065080 A1 | 5/2015 |
| WO | 2016047904 A1 | 3/2016 |
| WO | 2016072501 A1 | 5/2016 |
| WO | 2016163544 A1 | 10/2016 |
| WO | 2016191985 A1 | 12/2016 |
| WO | 2017164901 A1 | 9/2017 |

OTHER PUBLICATIONS

Catt "Limiting UE pre-processing for split bearer", 3GPP TSG-RAN WG2#99bis, R2-1710308, Oct. 9-13, 2017, pp. 1-2.

Oppo, "Discussion on threshold for UL data split", 3GPP TSG-RAN2 Meeting #99bis, R2-1710143, Oct. 9-13, 2017, pp. 1-5.

Media Tek Inc., Qualcomm Inc., "Pre-processing and uplink data split", 3GPP TSG-RAN WG2 #99bis, R2-1710698, Oct. 9-13, 2017, pp. 1-3.

3GPP, "3rd Generation Partnership" Project; Technical Specification Group Radio Access Network; Evolved Universal Terrestrial Radio Access (E-UTRA); Packet Data Convergence Protocol (PDCP) specification (Release 14), #GPP TS 36.323 v14.2.0, Mar. 2017, pp. 1-43.

Lenovo et al., "Threshold for NR UL split bearer", 3GPP TSG-RAN WG2 Meeting #99bis, R2-1711037, Oct. 9-13, 2017, pp. 1-2.

Catt, "Remaining issues for duplication/split bearer", 3GPP TSG-RAN WG2 #99bis, R2-1710310, Oct. 9-13, 2017, pp. 1-6.

Nokia Networks et al., "Uplink split bearer for eLWA", 3GPP TSG-RAN WG2 Meeting #95, R2-164905, Aug. 22-26, 2016, pp. 1-3.

Samsung "Clarification on threshold based solution for UL split bearer", 3GPP TSG-RAN WG2 Meeting #98, R2-1705817, May 15-19, 2017, pp. 1-4.

* cited by examiner

200

| Transmission Data Size<br>210 |
|---|
| Split Bearer Configuration Indicator<br>215 |
| Data Split Threshold<br>220 |
| Routing Threshold<br>225 |
| Routing Mode<br>230 |
| Duplicate PDU Definition<br>235 |

PDU
250

Transit Timer
255

FIG. 2B

What # SPLIT BEARER PACKET DATA CONVERGE PROTOCOL PROTOCOL DATA UNIT ROUTING

This application is a continuation of U.S. patent application Ser. No. 15/469,325 entitled "SPLIT BEARER PACKET DATA CONVERGE PROTOCOL PROTOCOL DATA UNIT ROUTING" and filed on Mar. 24, 2017 for Joachim Loehr, which is incorporated herein by reference.

FIELD

The subject matter disclosed herein relates to routing Packet Data Converge Protocol (PDCP) Protocol Data Units (PDU) and more particularly relates to split bearer routing of PDCP PDU.

BACKGROUND

Description of the Related Art

A mobile device may transmit data to two or more cell groups.

BRIEF SUMMARY

A method for routing PDCP PDU is disclosed. The method detects, by use of a processor, a split bearer configuration for a mobile device. In response to detecting the split bearer configuration, the method routes PDCP PDU in a Radio Link Control (RLC)/Medium Access Control (MAC) for the at least two cell groups. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2B is a schematic block diagram illustrating one embodiment of communication data;

DETAILED DESCRIPTION

Figure 1:
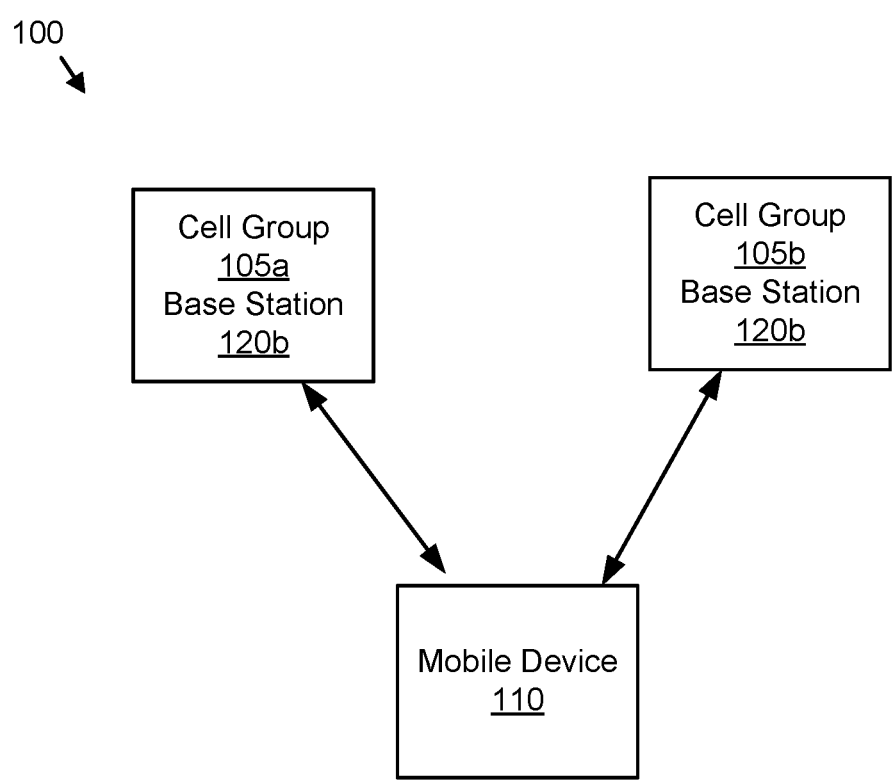
FIG. 1 is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a communication system 100. The system 100 includes two or more base stations 120 and a mobile device 110. The mobile device 110 may communicate with the base stations 120 on the cells of a cell groups 105 associated with the base stations 120. The cell groups 105 may be associated with a gNodeB (gNB) base station 120, i.e. New Radio (NR) base station 120, or an enhanced evolved node B (eNB) Long Term Evolution (LTE) base station 120. In one embodiment, a first cell group 105*a* may be associated with a Master Node and a second cell group 105*b* may be associated with a Secondary Node. The group of the serving cells associated with the Master Node may be a Master Cell Group (MCG), the group of serving cells associated with the Secondary Node may be a Secondary Cell Group (SCG). The mobile device 110 may be a mobile telephone, a machine-type communications (MTC) device, a tablet computer, a laptop computer, and embedded communication devices in automobiles, kiosks, appliances, and the like.

In one embodiment, the mobile device 110 is in communication with the first cell group/first node 105*a* and the second cell group/second node 105*b*. To increase data transmission to the cell groups 105, the mobile device 110 may perform split bearer transmission, transmitting data of one radio bearer to two or more cell groups 105. Unfortunately, the mobile device 110 may inaccurately report the quantity of data to be transmitted to each cell group 105, causing each cell group 105 to allocate excessive buffer space for the data. In addition, the mobile device 110 may be unable to determine the quantity of data that will be transmitted to each cell group 105 before the mobile device 110 receives an Uplink (UL) grant.

The embodiments described herein transmit data from the mobile device 110 to the cell groups 105 in a split bearer mode by routing and/or preprocessing a specified number of Protocol Data Units (PDU) as will be described hereafter.

Figure 2A:
FIG. 2A is a schematic block diagram illustrating one embodiment of split bearer data.

FIG. 2A is a schematic block diagram illustrating one embodiment of split bearer data 200. The split bearer data 200 maybe organized as a data structure in a memory. In the depicted embodiment, the split bearer data 200 includes a transmission data size 210, a split bearer configuration indicator 215, a data split threshold 220, a routing threshold 225, a routing mode 230, and a duplicate PDU definition 235.

The transmission data size 210 may record the quantity of data that is available for transmission from the mobile device 110 to the cell groups 105. The transmission data size 210 may be measured in bytes, kilobytes, megabytes, and the like.

The split bearer configuration indicator 215 may indicate that the mobile device 110 is configured for split bearer data transmission to two or more cell groups 105. The data split threshold 220 may indicate a quantity of data that if exceeded, may cause the mobile device 110 to communicate the data in a split bearer transmission. In one embodiment, the data split threshold 220 is a number of Packet Data Converge Protocol (PDCP) PDU.

The routing threshold 225 may specify a maximum quantity of PDCP PDU that is routed to a first cell group 105*a* and/or to a second cell group 105*b*. The routing threshold 225 may also specify a maximum quantity of data in bytes, kilobytes, megabytes, and the like that is routed to a first cell group 105*a* and/or to a second cell group 105*b*. The routing mode 230 may specify a PDU routing method for split bearer transmission. The duplicate PDU definition 235 may specify the contents of a duplicate PDU. In one embodiment, the duplicate PDU definition 235 specifies that a duplicate PDU be transmitted as an empty PDU that includes only a header and does not include data.

Figure 2B:
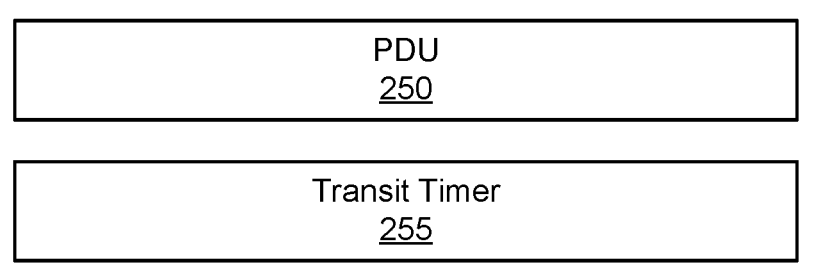

FIG. 2B is a schematic block diagram illustrating one embodiment of communication data. The communication data maybe organized as a data structure in memory and/or wirelessly transmitted. In the depicted embodiment, the communication data includes a PDU 250. In addition, the communication data may include a transit timer 255. The transit timer 255 may be a timer and/or a timer register.

Figure 3:
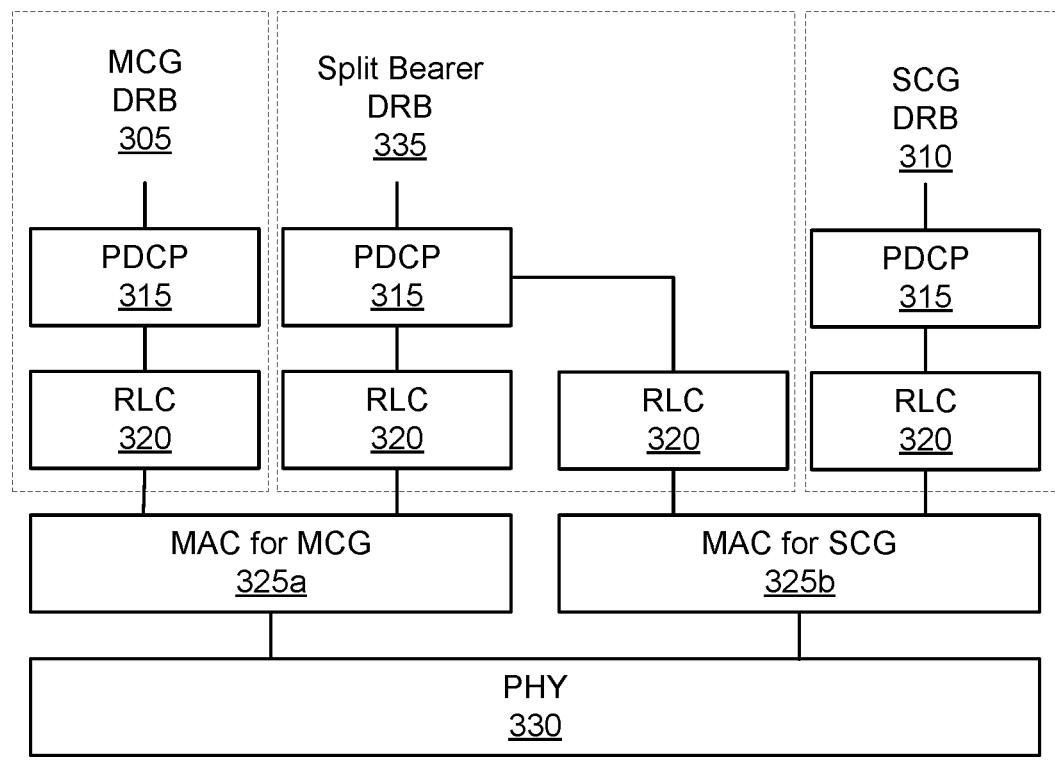
FIG. 3 is a schematic block diagram illustrating one embodiment of mobile device transmission layers.

FIG. 3 is a schematic block diagram illustrating one embodiment of mobile device transmission layers 300. The mobile device transmission layers 300 maybe organized as a combination of data structures, registers, and semiconductor hardware. In the depicted embodiment, the layers 300 include a PDCP 315, a Radio Link Control (RLC), a MAC for MCG 325*a*, a MAC for SCG 325*b*, and a physical (PHY) 325 layers. A plurality of PDCP 315 and RLC 320 may be distributed between an MCG Data Radio Bearer (DRB) 305, a split bearer DRB 335, and an SCG DRB 310.

A PDCP 315 may generate one or more PDU from data that is to be transmitted from the mobile device 110 to the cell groups 105. The RLC 320 and MAC 325 may generate PDU 250 from the PDCP PDU. The PHY 330 may transmit the PDU 250 to a cell group respectively the associated node 105. Data may be communicated via one of the MCG DRB 305, split bearer DRB 335, and SCG DRB 310 as will be described hereafter.

Figure 4:
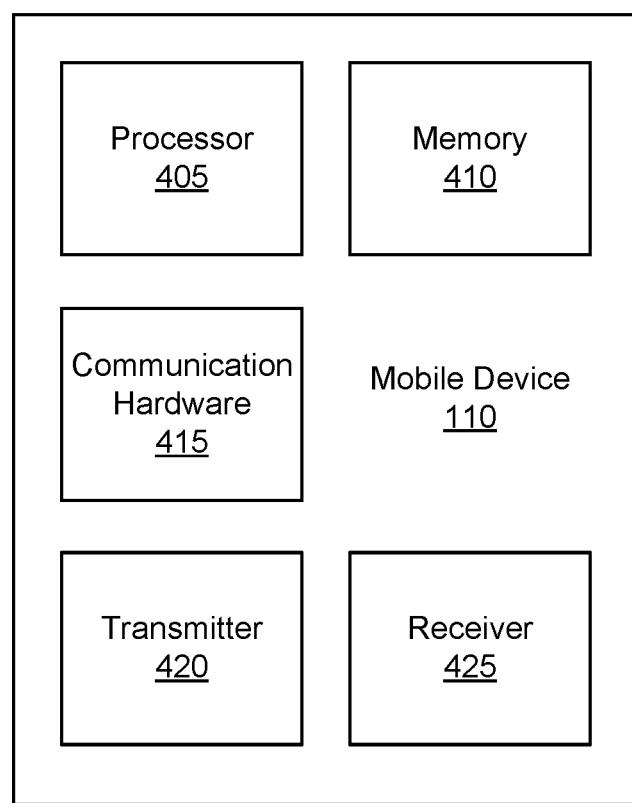
FIG. 4 is a schematic block diagram illustrating one embodiment of a mobile device.

FIG. 4 is a schematic block diagram illustrating one embodiment of a transceiver 400. The transceiver 400 may be the mobile device 110. Alternatively, the transceiver 400 may be the cell group 105. In the depicted embodiment, the transceiver 400 includes a processor 405, a memory 410, communication hardware 415, a transmitter 420, and a receiver 425. The memory 410 may be a semiconductor storage device, an optical storage device, micromechanical storage device, a magnetic storage device, or combinations thereof. The memory 410 may store code. The processor 405 may execute the code. The communication hardware 415 may direct data within the mobile device 110. The transmitter 420 may transmit PDU 250 to a cell group 105 and/or mobile device 110. The receiver 425 may receive PDU 250 from a cell group 105 and/or mobile device 110.

Figure 5A:
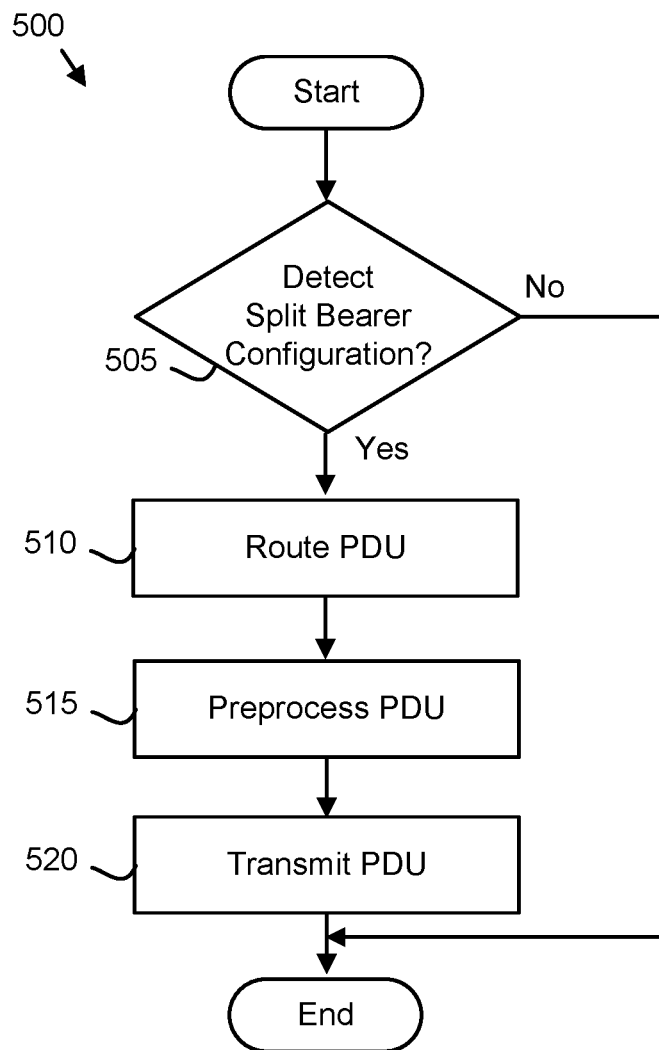
FIG. 5A is a schematic flow chart diagram illustrating one embodiment of a split bearer routing method.

FIG. 5A is a schematic flow chart diagram illustrating one embodiment of a split bearer routing method 500. The method 500 may route PDU 250 to at least two cell groups 105 as a split bearer transmission. The method 500 may be performed by the mobile device 110 and/or the processor 405.

The method 500 starts, and in one embodiment, the processor 405 detects 505 a split bearer configuration for a mobile device 110. The processor 405 may query the split bearer configuration indicator to detect 505 the split bearer configuration.

In response to detecting 505 the split bearer configuration, the processor may route 510 PDCP PDU 250 of the split bearer DRB 335 to the RLC 320/MAC 325 for at least one of the MCG and the SCG. The embodiments of routing of the PDU 250 is described in more detail in FIGS. 5B-F. In one embodiment, a base station 120 associated with a cell group 105 may direct the mobile device 110 to route the PDCP PDU 250. For example, the base station 120 may set the split bearer configuration indicator 215. In addition, the base station 120 may specify the routing mode 230.

The RLC 320/MAC 325 may preprocess 515 the PDU 250 for transmission. The PHY 330 may transmit 520 the preprocessed PDU 250 and the method 500 ends.

Figure 5B:
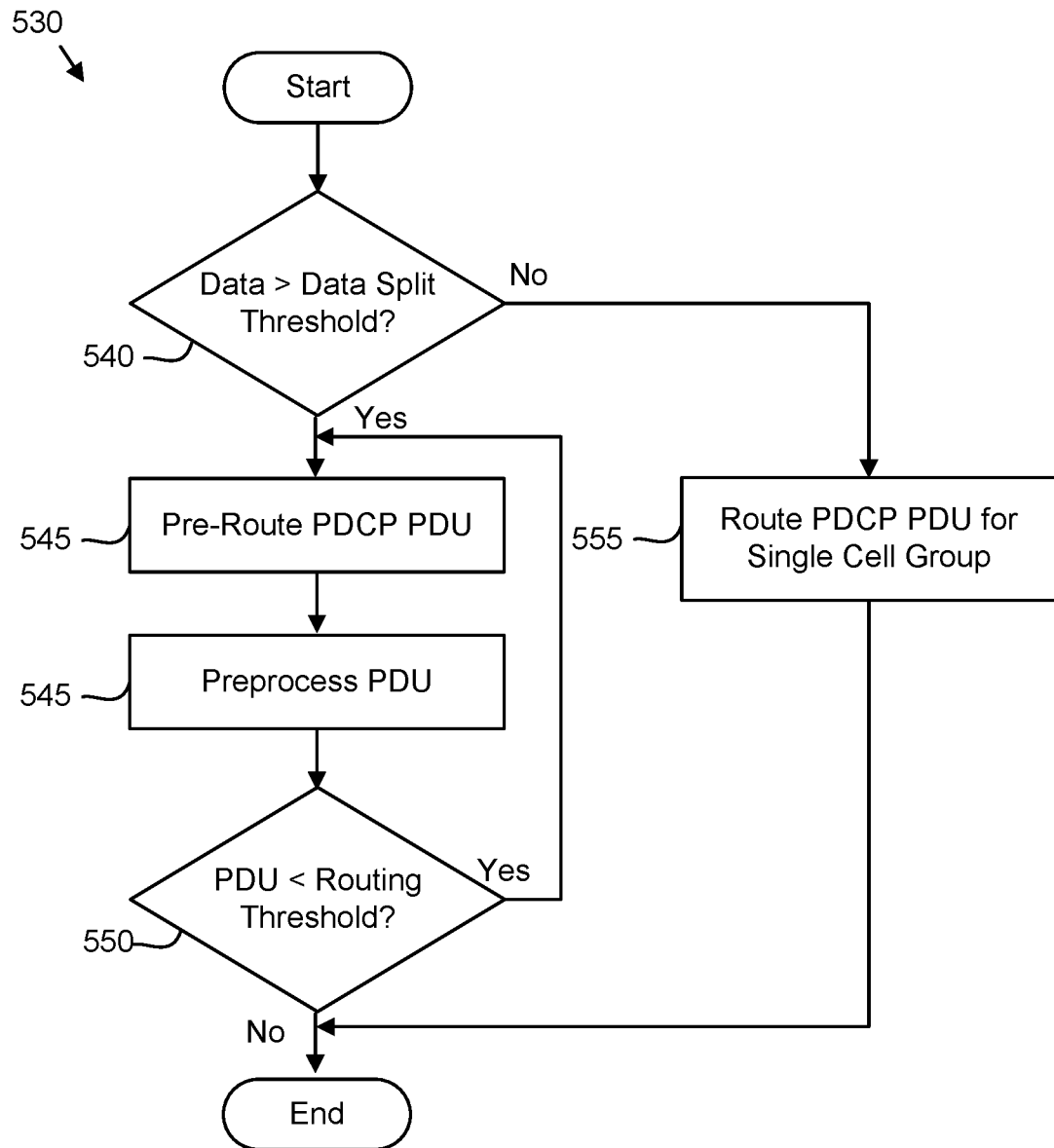
FIG. 5B is a schematic flow chart diagram illustrating one embodiment of a PDU routing method.

FIG. 5B is a schematic flow chart diagram illustrating one embodiment of a PDU routing method 530. The method 530 may perform step 510 of FIG. 5A. The method 530 may be performed by the mobile device 110 and/or the processor 405.

The method 530 starts, and the processor 405 determines 540 if the transmission data size 210 of PDCP PDU 250 exceeds the data split threshold 220. If the transmission data size 210 does not exceed the data split threshold 220, the processor 405 may route 555 the PDCP PDU 250 through the RLC 320/MAC 325 of either the MCG or the SCG and the method 530 ends. If the transmission data size 210 of PDCP PDU 250 exceeds the data split threshold 220, the processor 405 may pre-route 545 PDCP PDUs to at least one of the RLC 320/MAC 325 of the MCG and the RLC 320/MAC 325 of the SCG and preprocess 547 PDU 250 at the RLC 320/MAC 325 for transmission through the PHY 330. In one embodiment, the processor 405 may continue to pre-route 545 and preprocess 547 the PDU 250 until the processor 405 determines 550 that the pre-routed PDU(s) 250 exceed the routing threshold 225. If the pre-routed PDU(s) 250 exceed the routing threshold 225, the method 530 ends. The pre-routed, preprocessed PDU 250 may be transmitted by the PHY 330.

In one embodiment, a bases station 120 associated with a cell group 105 may direct the mobile device 110 to pre-route 545 the PDCP PDU 250 of a split bearer. For example, the base station 120 may set the split bearer configuration indicator 215. In addition, the base station 120 may specify the routing mode 230 to be the method 530, the data split threshold 220, and/or the routing threshold 225. In one embodiment, a base station 120 may specify the routing threshold 225 for each cell group, e.g., MCG and SCG part of the split bearer, independently.

Figure 5C:
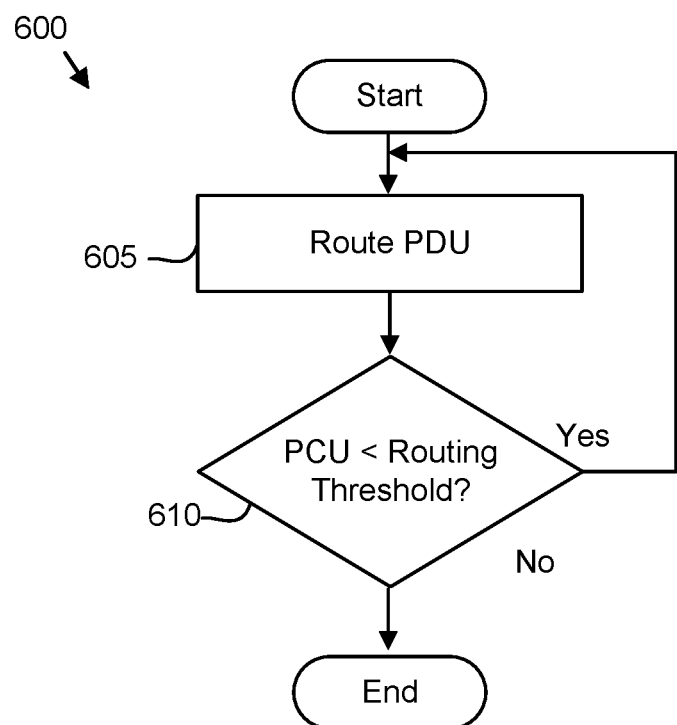
FIG. 5C is a schematic flow chart diagram illustrating one alternate embodiment of a PDU routing method.

FIG. 5C is a schematic flow chart diagram illustrating one alternate embodiment of a PDU routing method 600. The method 600 may perform step 510 of FIG. 5A. The method 600 may be performed by the mobile device 110 and/or the processor 405.

The method 600 starts, and in one embodiment, the processor 405 routes 605 PDCP PDU 250 of the split bearer DRB 335 to the RLC 320/MAC 325 of at least one of the MCG and the SCG. The processor 405 may continue to route 605 the PDU 250 until the routed PDU 250 exceed the routing threshold 225 and the method 600 ends. The pre-processed PDU 250 may be transmitted by the PHY 330.

In one embodiment, a base station 120 associated with a cell group 105 may direct the mobile device 110 to route 605 the PDCP PDU 250. For example, the base station 120 may set the split bearer configuration indicator 215. In addition, the base station 120 may specify the routing mode 230 to be the method 600 and/or the routing threshold 225. In one embodiment, a base station 120 may specify the routing threshold 225 for each cell group, e.g., MCG and SCG part of the split bearer, independently.

Figure 5D:
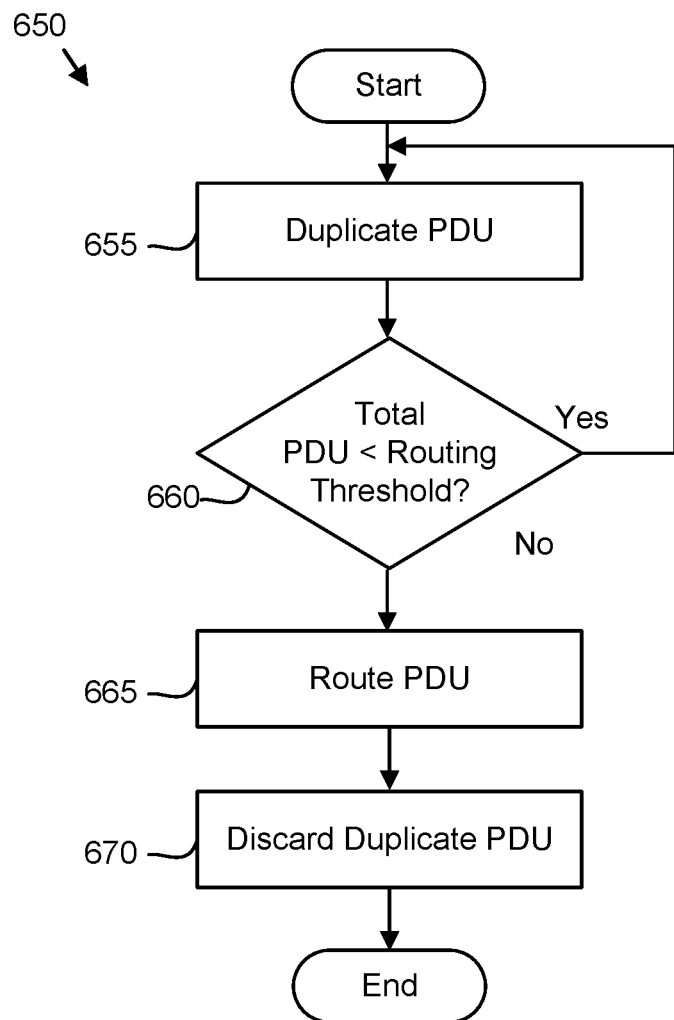
FIG. 5D is a schematic flow chart diagram illustrating one embodiment of a PDU routing method.

FIG. 5D is a schematic flow chart diagram illustrating one embodiment of a PDU routing method 650. The method 650 may perform step 510 of FIG. 5A. The method 650 may be performed by the mobile device 110 and/or the processor 405.

The method 650 starts, and in one embodiment, the processor 405 duplicates 655 the PDCP PDU 250. The processor 405 may continue to duplicate 655 the PDU 250 until determining 660 the total of PDU 250 exceed the routing threshold 225. In one embodiment, the routing threshold 225 is a duplicate routing threshold.

In response to the total PDU 250 exceeding the routing threshold 225, the processor 405 may route 665 the original PDCP PDU 250 to one of the RLC 320/MAC 325 of the MCG and the RLC 320/MAC 325 of the SCG, which is referred to hereafter as a first cell group 105a as described for FIG. 5C. The processor 405 may route 665 the duplicate PDCP PDU 250 to the other one of the RLC 320/MAC 325 of the MCG and the RLC 320/MAC 325 of the SCG, which is referred to hereafter as a second cell group 105b.

In response to transmitting a PDU 250 from the PHY 330 to the first cell group 105a, the processor 405 may discard 670 the corresponding duplicate PDU 250 queued for transmission to the second cell group 105b and the method 650 ends. In addition, the processor 405 may reorder the sequence numbers (SN) of the discarded PDU 250.

In one embodiment, a base station 120 associated with a cell group 105 may direct the mobile device 110 to duplicate 655 and route 665 the PDCP PDU 250. For example, the base station 120 may set the split bearer configuration indicator 215. In addition, the cell group 105 may specify the routing threshold 225 and set the routing mode 230 to the method 650. In one embodiment, a base station 120 may specify the routing threshold 225 for each cell group, e.g., MCG and SCG part of the split bearer, independently.

Figure 5E:
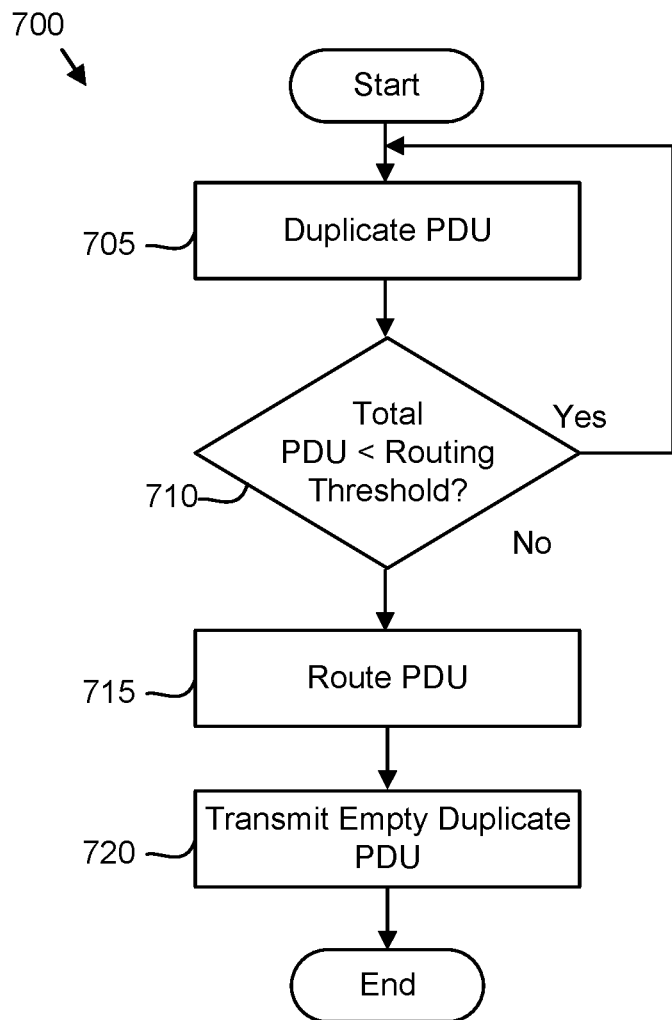
FIG. 5E is a schematic flow chart diagram illustrating one alternate embodiment of a PDU routing method.

FIG. 5E is a schematic flow chart diagram illustrating one alternate embodiment of a PDU routing method 700. The method 700 may perform step 510 of FIG. 5A. The method 700 may be performed by the mobile device 110 and/or the processor 405.

The method 700 starts, and in one embodiment, the processor 405 duplicates 705 the PDCP PDU 250. The processor 405 may continue to duplicate 705 the PDU 250 until the total of PDU 250 and duplicated PDU 250 is determined 710 to exceed the routing threshold 225. In one embodiment, the routing threshold 225 is a duplicate routing threshold.

In response to the total PDU 250 exceeding the routing threshold 225, the processor 405 may route 715 the original PDCP PDU 250 to one of the RLC 320/MAC 325 of the MCG and the RLC 320/MAC 325 for the SCG, which is referred to hereafter as a first cell group 105a as described for FIG. 5C. The processor 405 may route 715 the duplicate PDCP PDU 250 to the other one of the RLC 320/MAC 325 of the MCG and the RLC 320/MAC 325 for the SCG, which is referred to hereafter as a second cell group 105b.

In response to transmitting a PDU 250 from the PHY 330 to a first cell group 105a, the processor 405 may transmit 720 the corresponding duplicate PDU 250 queued for transmission to the second cell group 105b as an empty PDU 250 and the method 700 ends.

In one embodiment, a base station 120 associated with a cell group may direct the mobile device 110 to duplicate 705 and route 715 the PDCP PDU 250. For example, the base station 120 may set the split bearer configuration indicator 215. In addition, the base station 120 may specify the routing threshold 225 and set the routing mode 230 to the method 700. In one embodiment, a base station 120 may specify the routing threshold 225 for each cell group, e.g., MCG and SCG part of the split bearer, independently.

In one embodiment, if the UL grant from a base station 120 associated with one of the first cell group 105a and second cell group 105b exceeds the amount of data available for transmission, the PHY 330 may transmit 520 padding in response to the received UL grant. Alternatively, the PHY 330 may transmit 520 duplicate PDU 252 instead of padding in response to the received UL grant.

In a certain embodiment, the mobile device 110 may transmit data to one cell group 105/base station 120 via one of the MCG DRB 305 and SCG DRB 310. The mobile device 110 may be only allowed to route PDCP PDUs of the one of MCG DRB 305 and SCG DRB 310 to the RLC 320/MAC 325 and preprocess the PDCP PDU 250 at the RLC 320/MAC 325 for transmission through the PHY 330 up to a maximum amount of PDCP PDU.

Figure 5F:
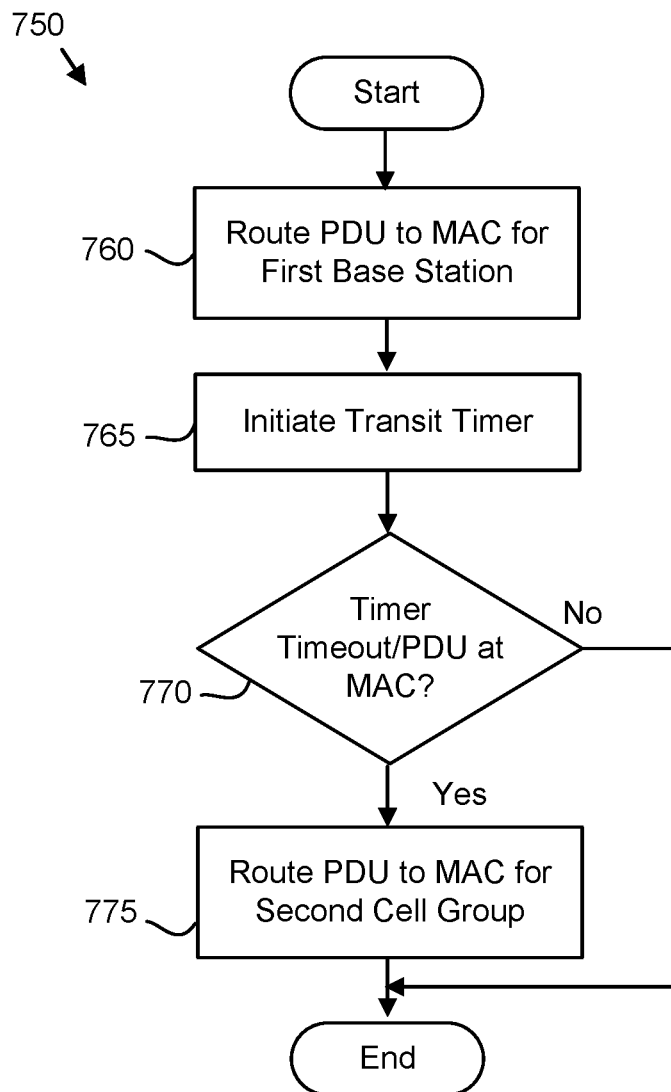
FIG. 5F is a schematic flow chart diagram illustrating one alternate embodiment of a PDU routing method.

FIG. 5F is a schematic flow chart diagram illustrating one alternate embodiment of a PDU pre-processing method 750.

The method 750 may perform step 510 of FIG. 5A. The method 750 may be performed by the mobile device 110 and/or the processor 405.

The method 750 starts, and in one embodiment, the processor 405 routes 760 the PDU 250 to one of the RLC 320/MAC 325 of the MCG and the RLC 320/MAC 325 for the SCG, which is referred to hereafter as a first cell group 105a.

The processor 405 may further initiate 765 the transit timer 255. The processor 405 may determine 770 if the transit timer 255 times out and the PDU 250 remains in the RLC 320/MAC 325 for the first cell group 105a. If the transit timer 255 does not time out before the PDU 250 is transmitted from the MAC 325 for the first cell group 105a, the method 750 ends.

If the transit timer 255 times out before the PDU 250 is transmitted from the MAC 325 for the first cell group 105a, the processor 405 may route 775 the PDU 250 to the RLC 320/MAC 325 of the second cell group 105b and the method 750 ends.

In one embodiment, a base station 120 may direct the mobile device 110 to employ the transit timer 255. For example, the base station 120 may set the split bearer configuration indicator 215. In addition, the base station 120 may set the routing mode 230 to the method 750 and specify a duration for the transit timer 255.

Figure 5G:
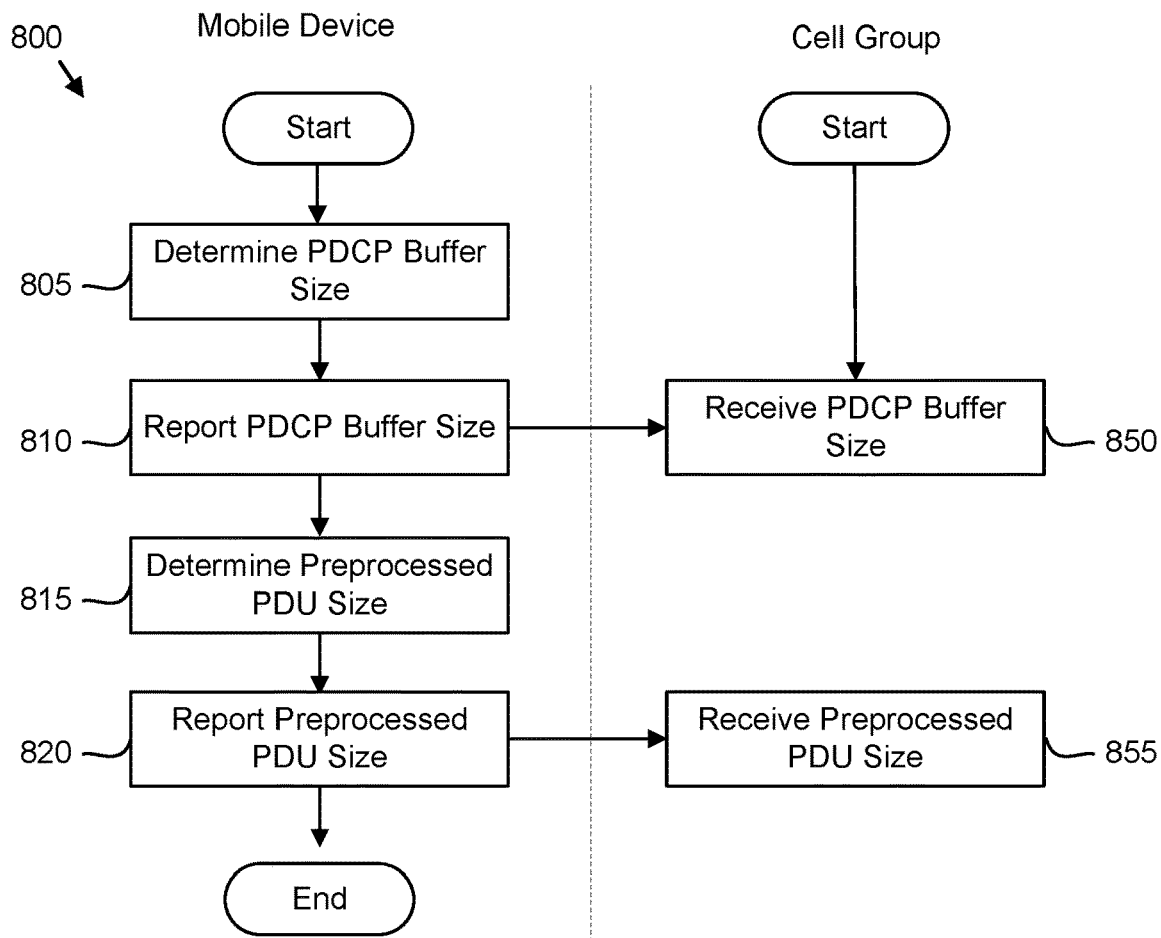
FIG. 5G is a schematic flowchart diagram illustrating one embodiment of a split bearer mode management method.

FIG. 5G is a schematic flowchart diagram illustrating one embodiment of a split bearer mode management method 800. The method 800 may determine the routing mode 234 split bearer transmissions from the mobile device 110. The method 800 may be performed by the mobile device 110, the base stations 120 associated with the cell groups 105, and/or processors 405 incorporated therein.

The method 800 starts, and in one embodiment, the mobile device processor 405 determines 805 a PDCP buffer size. The mobile device processor 405 may further report 810 the PDCP buffer size to one or more base stations 120 associated with cell groups 105, which receives 850 the PDCP buffer size.

In one embodiment, the mobile device processor 405 may determine 815 the size of the preprocessed PDU 250 for each cell group 105. The mobile device processor 405 may further report 820 the preprocessed PDU size of each cell group 105 to the associated base station 120, which receives 855 the processed PDU size and the method 800 ends.

In the past, for the mobile device 110 to route PDU 250 from the PDCP 315 to the RLC 320/MAC 325 for processing requires PDCP 315 to know to which cell group 105 the PDCP SDUs would be transmitted before the UL grant is received. Pre-processing by the RLC 320/MAC 325 is not possible for the NR-NR Dual connectivity and LTE-NR Dual connectivity case when UL split bearer operation was applied. When PDCP Buffer Occupancy (BO) is above a configured threshold as defined for Rel-13 UL bearer split operation, for example if ul-DataSplitThreshold is configured and the data available for transmission in PDCP 315 is larger than or equal to ul-DataSplitThreshold, the mobile device 110 reports to all cell groups 105 the same PDCP data amount for the purpose of buffer status reporting. As a result, the mobile device 110 indicates the data available for transmission in PDCP 315 to both the MAC 325 configured for SCG and the MAC 325 configured for MCG. Transmission takes place according to the received UL grants, with the mobile device 110 submitting the PDCP PDU 250 to either the associated AM RLC 320 configured for SCG or the associated AM RLC 320 configured for MCG, whichever the PDU 250 were requested by. Hence, the mobile device 110 doesn't know which cell group 105 the data will be transmitted to before UL grant reception; therefor pre-processing of PDCP/RLC/MAC header is not possible. The detailed mobile device 110 behavior for UL split bearer operation standardized in Rel.13 can be found in NR specification TS36.323.

The embodiments support split bearer transmission of data from the mobile device 110 in a split bearer operation to two or more base stations 120/cell groups 105 by routing PDCP PDU 250 to RLC 320/MAC 325 for preprocessing before receiving an UL grant. A limited number of PDCP PDU 250 are routed to the RLC 320/MAC 325 for preprocessing. As a result, when the UL grant is received, the PDU 250 may be rapidly transmitted to the cell group 105, Therefore, data transmission to the cell groups 105 is enhanced. By routing only a limited number of PDCP PDU 250 to the RLC 320/MAC 325 for pre-processing the mobile device 110 still benefits from being scheduled by both cell groups 105/base stations 120. The mobile device 110 indicates the same PDCP buffer status, i.e. the data available for transmission in PDCP 315 for BSR triggering and Buffer Size calculation, to both the MAC entity 325 configured for SCG and the MAC entity 325 configured for MCG and transmits PDCP SDUs according to received uplink grants. The PDCP PDUs 250 above the routing threshold 225 is kept in the PDCP buffer and only routed to the corresponding RLC 320/MAC 325 based on the received UL grants. In addition, by not routing all PDCP PDU 250 to RLC 320/MAC 325 for preprocessing, the probability that PDCP PDUs 250 transmitted successfully over one cell group 105 cannot be delivered to an upper layer due to missing PDCP PDUs 250 awaiting transmission via the other cell group 105 is reduced. The amount of routed PDCP PDUs 250 as defined by the routing threshold 225 ensures that a sufficient amount of pre-processing is possible in order to meet the processing timing requirements, i.e. generating the transport block in the given time period. The routing of only a limited number of PDCP PDU 250 enables the pre-processing of RLC 320 and MAC 325 layer of the gNB cell group(s) by pre-allocating the PDCP PDUs 250 to the cell group(s) 105 before receiving the UL grant.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting, by use of a processor, two Radio Link Control (RLC) entities associated with a Packet Data Converge Protocol (PDCP) and an amount of data available for transmission exceeding a data split threshold; and
   in response to detecting both the two RLC entities and the amount of data available for transmission exceeding the data split threshold, routing PDCP Protocol Data Units (PDU)s to at least one of the two RLC entities before receiving a request from an associated RLC entity configured for one of a Secondary Cell Group (SCG) and a Master Cell Group (MCG).

2. The method of claim 1, wherein an amount of PDUs routed to the at least one of the two RLC entities before the reception of an Uplink (UL) grant are less than a maximum amount.

3. The method of claim 1, wherein the PDUs are transmitted to either the MCG or the SCG via a split bearer.

4. The method of claim 1, wherein the routing the PDUs comprises:
 duplicating a PDU to create a first duplicate PDU and a second duplicate PDU;
 routing the duplicated PDUs to each of a first RLC entity and a second RLC entity; and
 in response to transmitting the first duplicate PDU, discarding the corresponding second duplicate PDU routed to the second RLC entity.

5. The method of claim 1, wherein routing the PDU comprises:
 duplicating a PDU to create a first duplicate PDU and an empty second duplicate PDU;
 routing the duplicated PDU to each of a first RLC entity and a second RLC entity; and
 in response to transmitting the first duplicate PDU to a first cell group, transmitting the empty corresponding second duplicate PDU to a second cell group, wherein an empty PDU comprises a header and does not comprise data.

6. The method of claim 1, wherein the method further comprises:
 initiating a transit timer in response to routing a first PDU from a first RLC entity to a first Medium Access Control (MAC) for a first cell group; and
 routing the first PDU from a second RLC entity to a second MAC for a second cell group in response to the transit timer timing out before the first PDU is communicated from the first MAC for the first cell group.

7. The method of claim 1, wherein each RLC entity communicates PDU through a distinct MAC to a distinct cell group.

8. An apparatus comprising:
 a processor performing:
 detecting two Radio Link Control (RLC) entities associated with a Packet Data Converge Protocol (PDCP) and an amount of data available for transmission exceeding a data split threshold; and
 in response to detecting both the two RLC entities and the amount of data available for transmission exceeding the data split threshold, routing PDCP Protocol Data Units (PDU)s to at least one of the two RLC entities before receiving a request from an associated RLC entity configured for one of a Secondary Cell Group (SCG) and a Master Cell Group (MCG).

9. The apparatus of claim 8, wherein an amount of PDUs routed to the at least one of the two RLC entities before the reception of an Uplink (UL) grant are less than a maximum amount.

10. The apparatus of claim 8, wherein the PDUs are transmitted to either the MCG or the SCG via a split bearer.

11. The apparatus of claim 8, wherein the routing the PDUs comprises:
 duplicating a PDU to create a first duplicate PDU and a second duplicate PDU;
 routing the duplicated PDUs to each of a first RLC entity and a second RLC entity; and
 in response to transmitting the first duplicate PDU, discarding the corresponding second duplicate PDU routed to the second RLC entity.

12. The apparatus of claim 8, wherein routing the PDU comprises:
 duplicating a PDU to create a first duplicate PDU and an empty second duplicate PDU;
 routing the duplicated PDU to each of a first RLC entity and a second RLC entity; and
 in response to transmitting the first duplicate PDU to a first cell group, transmitting the empty corresponding second duplicate PDU to a second cell group, wherein an empty PDU comprises a header and does not comprise data.

13. The apparatus of claim 8, wherein the processor further performs:
 initiating a transit timer in response to routing a first PDU from a first RLC entity to a first Medium Access Control (MAC) for a first cell group; and
 routing the first PDU from a second RLC entity to a second MAC for a second cell group in response to the transit timer timing out before the first PDU is communicated from the first MAC for the first cell group.

14. A program product comprising a non-transitory computer readable storage medium that stores code executable by a processor, the executable code comprising code to perform:
 detecting two Radio Link Control (RLC) entities associated with a Packet Data Converge Protocol (PDCP) and an amount of data available for transmission exceeding a data split threshold; and
 in response to detecting both the two RLC entities and the amount of data available for transmission exceeding the data split threshold, routing PDCP Protocol Data Units (PDU)s to at least one of the two RLC entities before receiving a request from an associated RLC entity configured for one of a Secondary Cell Group (SCG) and a Master Cell Group (MCG).

15. The program product of claim 14, wherein an amount of PDUs routed to the at least one of the two RLC entities before the reception of an Uplink (UL) grant are less than a maximum amount.

16. The program product of claim 14, wherein the PDUs are transmitted to either the MCG or the SCG via a split bearer.

17. The program product of claim 14, wherein the routing the PDUs comprises:
 duplicating a PDU to create a first duplicate PDU and a second duplicate PDU;
 routing the duplicated PDUs to each of a first RLC entity and a second RLC entity; and
 in response to transmitting the first duplicate PDU, discarding the corresponding second duplicate PDU routed to the second RLC entity.

18. The program product of claim 14, wherein routing the PDU comprises:
 duplicating a PDU to create a first duplicate PDU and an empty second duplicate PDU;
 routing the duplicated PDU to each of a first RLC entity and a second RLC entity; and
 in response to transmitting the first duplicate PDU to a first cell group, transmitting the empty corresponding second duplicate PDU to a second cell group, wherein an empty PDU comprises a header and does not comprise data.

19. The program product of claim 14, wherein the processor further performs:
 initiating a transit timer in response to routing a first PDU from a first RLC entity to a first Medium Access Control (MAC) for a first cell group; and
 routing the first PDU from a second RLC entity to a second MAC for a second cell group in response to the transit timer timing out before the first PDU is communicated from the first MAC for the first cell group.

20. The program product of claim 14, wherein each RLC entity communicates PDU through a distinct MAC to a distinct cell group.

\* \* \* \* \*